Oct. 22, 1957     T. H. HARRISON     2,810,224
DATE INDICATORS

Filed May 21, 1953     4 Sheets-Sheet 1

INVENTOR:
T. H. HARRISON
BY
ATTORNEYS

Oct. 22, 1957  T. H. HARRISON  2,810,224
DATE INDICATORS

Filed May 21, 1953  4 Sheets-Sheet 2

INVENTOR:
T.H. HARRISON
BY: *Marre & Hall*
ATTORNEYS

Oct. 22, 1957     T. H. HARRISON     2,810,224
DATE INDICATORS

Filed May 21, 1953                                4 Sheets-Sheet 3

INVENTOR:
T. H. HARRISON
BY
ATTORNEYS

Oct. 22, 1957  T. H. HARRISON  2,810,224
DATE INDICATORS
Filed May 21, 1953  4 Sheets-Sheet 4

ON YEAR RING

AS ON DEEP MONTH RING TOOTH

RAKE FEEDING MONTH & YEAR RING

INVENTOR:
T. H. HARRISON
BY: Moore & Hall
ATTORNEYS-

United States Patent Office 2,810,224
Patented Oct. 22, 1957

2,810,224

DATE INDICATORS

Thomas H. Harrison, Bolsover, near Chesterfield, England

Application May 21, 1953, Serial No. 356,412

Claims priority, application Great Britain May 23, 1952

6 Claims. (Cl. 40—113)

The present invention relates to date indicators primarily intended to be actuated by a clock capable of imparting a feeding movement to the indicator mechanism once every twenty-four hours and capable of indicating at least the date (i. e. the number of the day) and the name of the month, of the kind which employ a rotatable date ring and a rotatable month ring arranged concentrically and in the same plane, said rings having cam tracks upstanding therefrom adapted to co-operate with a control or cover plate, and a normally unidirectionally rotatable member adapted to co-operate with the cam tracks and thereby provide the requisite movement of the rings, the amount of feed of the rings being determined by tongues formed in the cover plate and the position of the tongues (and thus the amount of feed) being determined by the positions of the rings. Such a date indicator is described for example in British specification No. 543,270.

It is an object of the present invention to provide a date indicator of the type referred to of simplified construction.

According to the present invention, in a date indicator of the kind referred to each ring has a single track formed thereon, each said track being adapted both to co-operate with the rotatable feed member to effect feed of the ring and with the control or cover plate to effect the requisite control of the feed imparted to other rings.

Preferably the parts are so shaped and arranged that feed of the rings can only occur for one direction of rotation of the rotatable member.

Preferably the parts are so shaped and arranged that feed of the date and month rings occurs over distinct portions of the rotation of the rotatable member, so that setting of the indicator can be effected by oscillation of the rotatable member.

Preferably when the indicator incorporates a "day" ring the mechanism is arranged so that the date change-over occurs during part of the day change-over, so that the arc of rotation of the rotatable member, and hence the time interval, for the complete change is kept relatively short.

Preferably also when the mechanism incorporates a year ring having twelve teeth the mechanism is arranged so that the "year" change-over occurs simultaneously with the change-over from "December" to "January."

A date indicator embodying the invention will now be described with reference to the accompanying drawings of which:

Figure 1:
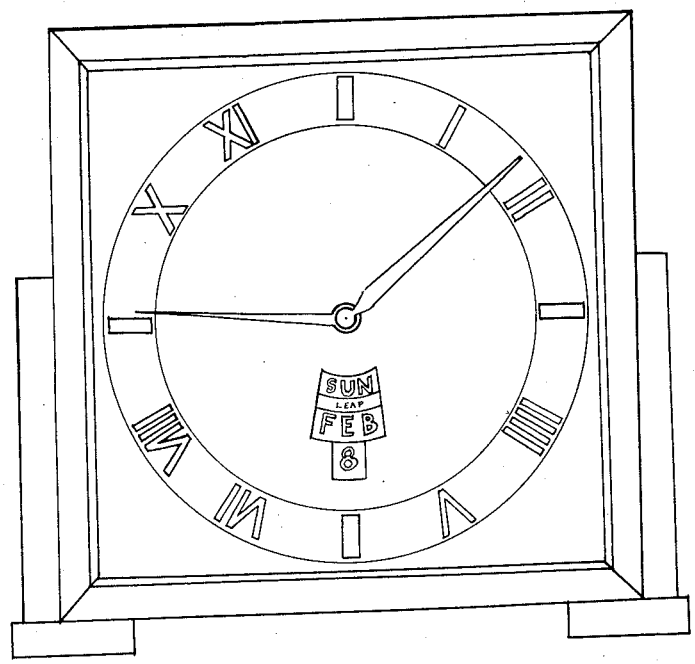
Figure 1 shows a front view of a clock incorporating the indicator.
Figure 2:
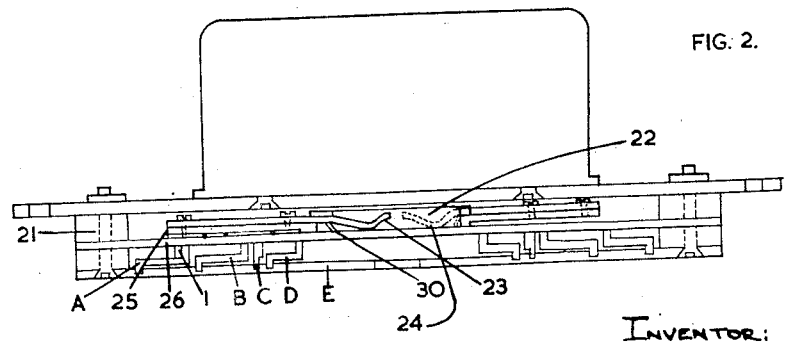
Figure 2 shows a section through the clock and indicator.
Figure 3:
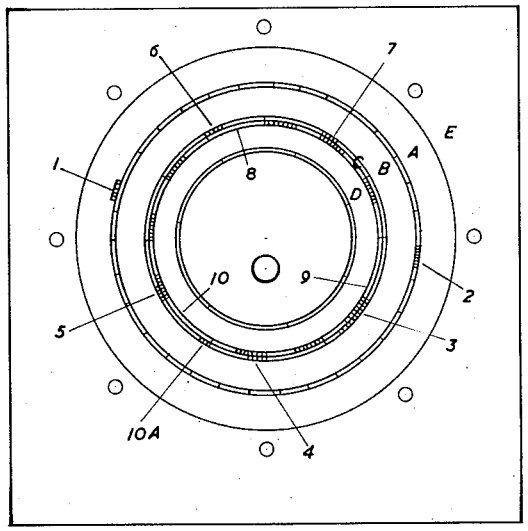
Figure 3 shows a view of the base plate and indicating rings from behind the face of the clock of Figure 1, the more important teeth being indicated by shading.
Figure 4:
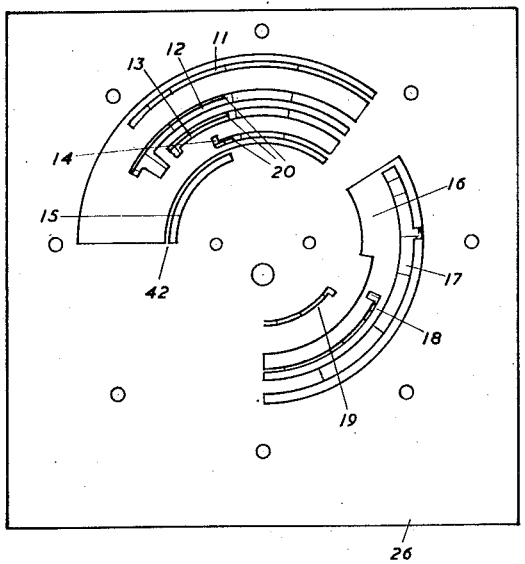
Figure 4 shows a view of the cover plate, or grid, from the same direction or rake member, from the same direction.
Figure 5:
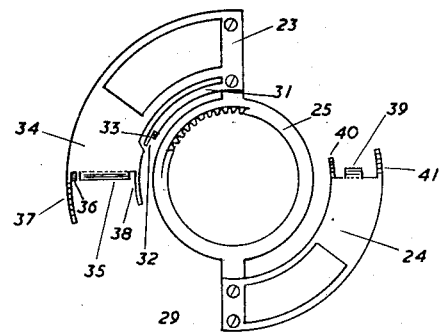
Figure 5 shows a view of the rotatable member.
Figure 6:
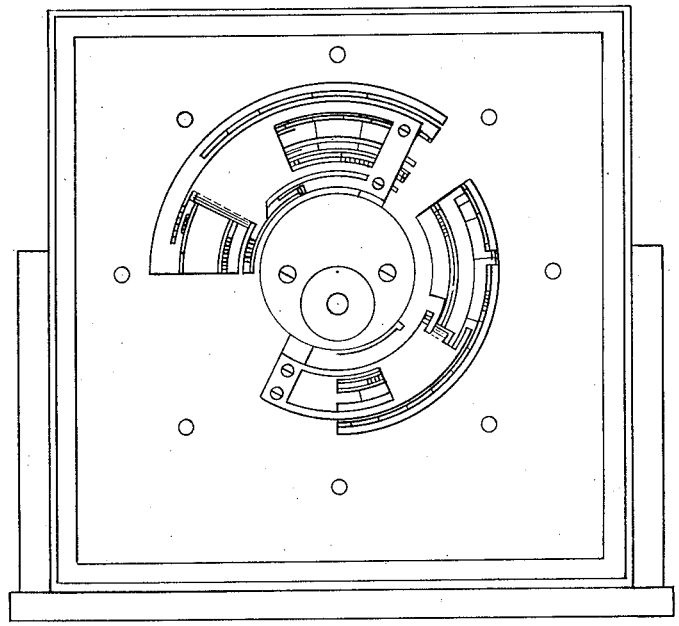
Figure 6 shows a view of the rake cover plate and ring in their operating position from the same direction as the change from 31st August to 1st September in a leap year is about to take place.

It will be seen that there is provided a base plate E, forming also the clock dial, which carries, located by suitable concentric grooves, a date ring A, a month ring B, a year ring C and a day ring D. Each of these (except C) is generally L-shaped in section (except for a rim engaging with an appropriate groove in the base), the base of each L in contact with the base plate E being provided with appropriate markings visible from the front of the clock through an aperture cut in the base plate E. The upright portion of each L is provided with a cam track (as in Figures 7 to 14), by means of which the various rings are fed forward through appropriate amounts; the year ring is not L-shaped, and has a comparatively narrow base which carries three sets of the sequence of markings "Leap," "1," "2," "3." There is superposed upon the rings a cover-plate or grid 26 (Figure 4), provided with a number of apertures through which the teeth of the rings protrude and also provided with a plurality of tongues by means of which certain of the rings control the feed imparted to other of the rings, in a manner described below. In turn a rotatable member, or rake member 29 (Figure 5) is carried in a bearing 22, superposed upon the grid 26 and adapted to be rotated by the clock mechanism via suitable gearing through one revolution per day. Rakes 23 and 24 (of resilient material) are attached to rake carrier 22. Rake 23 is provided with a day ring actuating tongue 31 which is formed at the end remote from the point of attachment with 25, with a tooth 32 and a depth-control portion 33. Rake 23 is also provided with a date-ring actuating tongue 35 which is provided, at the end remote from the point of attachment with 25, with two date ring actuating teeth 35, comparatively wide and shallow, and 36, comparatively narrow and deep, together with depth control portions 37 and 38. Rake 24 is provided with a month and year ring actuating tooth 39 together with depth control portions 40 and 41. The general shape of the teeth and depth control portions can be most readily appreciated from Figure 2. It should be mentioned that member 25 rotates in an anti-clockwise direction as shown in Figures 5 and 6.

The day ring D is formed with seven similar teeth, and carries on the part next to the baseplate E the names of the seven days of the week (or abbreviations for them).

Figure 7:
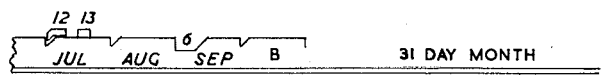
Figures 7 to 14 show various views in profile of the teeth of the cam tracks, together with various other parts co-operating therewith.
Figure 8:
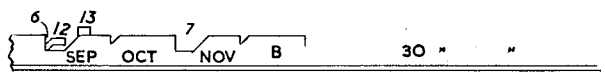
Figure 9:
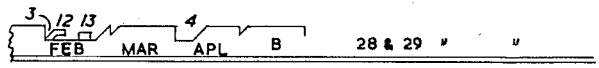
Figure 10:
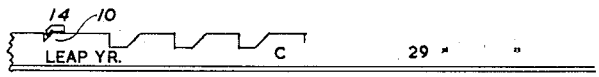
Figure 11:
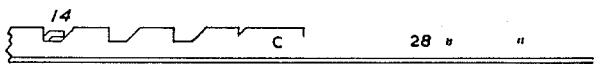
Figure 12:
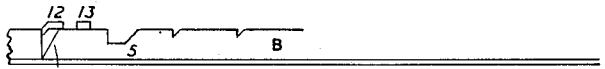
Figure 13:
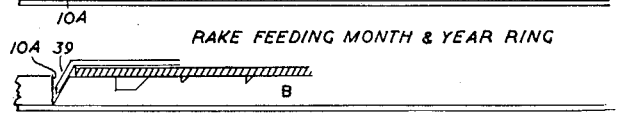
Figure 14:
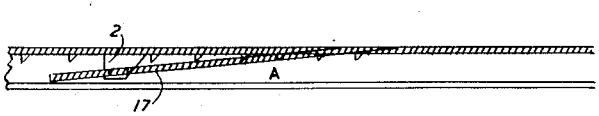

The month ring B is formed with 31 teeth of the various forms shown in Figures 7, 8 and 9. Seven of these teeth (corresponding to the 31 day months) are of the form labelled, e. g. "JUL" in Figure 7. Four of the teeth (4, 5, 6, 7) corresponding to the months of April, June, September and November, are of the form labelled, e. g. "NOV," in Figure 8. The remaining tooth, 3, corresponding to the month of February, is of the form shown in Figure 9. One of the "normal" teeth is provided with a deep but narrow cut 10a.

The year ring C has 12 teeth (three sets of four, corresponding to three leap year cycles) with nine normal, deep, teeth, and three shallow, leap year, teeth 8, 9, 10.

The date ring A has 31 teeth which are all similar, except for a deep tooth 2. The ring is also provided with a side tooth 1 which, in certain circumstances, is engaged by the long tooth, 36, on the date rake.

The cover plate or grid 26 (Figure 4) is formed with a number of resilient tongues. Tongue 11 merely serves to hold the date ring A against the baseplate. Tongues 12 and 13 co-operate with the month ring teeth, and tongue 14 co-operates with the year ring teeth, to control the feed imparted to the date ring by rake 23. Tongues 12, 13, 14 are provided with ribs 20 which, unless the corresponding tongues are allowed to drop by the appropriate ring, hold tooth 36 out of engagement with side tooth 10.

Space 15 permits the depth control portions 33 and 38 to drop at an appropriate point in the cycle, and thus initiate action of the day change-over and the (normal) date change-over. The track 42 left between space 15 and that in which tongues 11 to 14 lie prevents depth control portion 40 from dropping, and so prevents rake 24 from actuating the month and year rings when in this position.

Space 16 is that in which feed of the month and year rings occurs. No feed of either the month or year ring occurs unless tongue 17 is in a position to allow depth control portion 41 to drop. Tooth 39 when it gives feed of the month ring does not also give feed of the year ring unless it drops into deep gap 10a, as the normal month teeth are such that even when the tooth 39 is at the bottom of the gap it is still clear of the year ring.

Tongue 18 has an end portion which rides over the month and year teeth and retains the rings in position, resting in a gap except when change-over is taking place. Tongue 19 similarly rides over the day teeth, retaining the day ring in position and resting in a gap except when change-over is taking place.

The manner of operation will now be described.

(1) Normal change-over (i. e. as midnight is approached on any date from 1 to 27 inclusive).
 (a) *Day change.*—33 drops into gap 15, tooth 32 engages day tooth. $\frac{1}{7}$ revolution later 33 rides out of gap 15, tooth 32 disengages day tooth (day change-over effected). The time at which the day change is effected may conveniently, but not necessarily, be midnight; and below when a change is said to occur at midnight the time of completion of the day change is meant.
 (b) *Date change.*—$\frac{1}{31}$ revolution of 25 before midnight, tooth 35 engages date tooth (35 having dropped into gap 15) at midnight 38 rides out of gap 15 (date change effected).

(2) Change-over at midnight of 31st of 31 day month (except December).
 (a) Date and day change as in (1).
 (b) *Month change.*—Tongue 17 is allowed to drop as date "1" is displayed, so at midnight 41 allows tooth 39 to engage month ring (Figure 14) and at $\frac{1}{12}$ rev. after midnight, tooth 39 rides out of gap 16.

(3) Midnight of 31 December.
 (a) "Date," day" and month change as under (2).
 (b) *Year change.*—During month change deep gap 10a allows tooth 39 to engage year ring, so that after completion of month change, year change has also been completed.

(4) Midnight of 30 day month.
 (a) *Date change.*—$\frac{2}{31}$ revolution of 25 before midnight, tongue 12 has dropped and so allows tooth 36 to engage side-tooth 1, thus giving requisite surplus feed.
 (b) Remainder of change-over as under (2).

(5) Midnight of 28 February (except in leap year).
 (a) *Date change.*—Tongues 12, 13, 14 allow tooth 36 to engage side-tooth 1 at $\frac{4}{31}$ revolution before midnight, so effecting requisite surplus feed.
 (b) Remainder of change as under (2).

(6) Midnight of 29 February in leap year.
 (a) *Date change.*—Tongues 12, 13 having dropped, allow tooth 36 to engage side-tooth 1 at $\frac{3}{31}$ revolution before midnight. (Tongue 14 not having dropped, see Figure 10, tooth 36 cannot engage side-tooth 1 at midnight on 28 February.)
 (b) Remainder of change-over as under (2).

It will be seen from the above description that the "date" change occurs over an arc of the movement of member 25 separate from that over which the "month" and "year" changes occur, although the "month" and "year" changes occur over part of the arc occupied by the "day" change.

This enables the mechanism to be set to the correct year and date at any time by manipulation of the hand setting mechanism. A method of adjustment, if all the rings require adjustment, is as follows:

(1) Set depth control portion 38 in gap 15, oscillate rotatable member by manipulation of hand setting mechanism until date "1" is displayed (this allows tongue 17 to drop and so allows the "month" and "year" rings to be adjusted).
(2) Rotate rotatable member forward until tooth 39 engages "month" and "year" rings, oscillate rotatable member through $\frac{1}{12}$ revolution until requisite month and year are displayed.
(3) Rotate rotatable member backward until tooth 32 engages "day" ring, oscillate through $\frac{1}{7}$ revolution until required day is displayed (during setting of "day," date setting will also be altered).
(4) Rotate rotatable member backwards $\frac{1}{31}$ revolution (to engage date tooth but not day tooth) oscillate through $\frac{1}{31}$ revolution till required date is displayed.
(5) Set hands backwards to correct time.

I claim:

1. A date indicator comprising a base plate, a date ring carrying the numerals 1 to 31 uniformly distributed in sequence thereupon, a month ring carrying designations of the twelve months uniformly distributed in sequence thereupon, said date and month rings being rotatably mounted in concentric relationship to each other upon said base plate, said base plate being provided with apertures through which the numerals and month designations may be viewed, and said rings being respectively provided with thirty-one and twelve teeth in a single row, a cover plate disposed substantially parallel to the base plate on the side of the rings away from said base plate, and a rotatable feed member, adapted to be rotated about the common center of the date and month rings, said cover plate being formed with first and second resilient tongues adapted to engage respectively with the teeth of the date and month rings, said feed member being formed with first and second tooth-engaging portions adapted to engage respectively with the teeth of the date and month rings and being positioned thereby, said first resilient tongue cooperating with the second tooth-engaging portion to permit the said portion to feed the month ring forward for a first arc of one-twelfth revolution of the rotatable feed member at the expiry of a month and said second resilient tongue cooperating with the first tooth-engaging portion to permit the said portion to feed the date ring forward for a second arc of revolution of the rotatable feed member, said first and second arcs occupying successive portions of the rotation of the rotatable member, at least one of said tongues cooperating with said teeth to prevent backward rotation of the ring carrying the teeth with which said tongue cooperates.

2. A date indicator comprising a base plate, a date ring carrying the numerals 1 to 31 uniformly distributed in sequence thereupon, a month ring carrying designations of the twelve months uniformly distributed in sequence thereupon, said date and month rings being rotatably mounted in concentric relationship to each other upon said base plate, said base plate being provided with apertures through which the numerals and month designations may be viewed, and said rings being respectively provided with thirty-one and twelve teeth, a cover plate disposed substantially parallel to the base plate on the side of the rings away from said base plate, and a rotatable feed member, adapted to be rotated about the common center of the date and month rings, said cover plate being formed with first and second resilient tongues adapted to engage respectively with the teeth of the date and month rings, said feed member being formed with first and second tooth-engaging portions adapted to engage respectively with the teeth of the date and month rings and being positioned thereby, said first resilient tongue cooperating with the second tooth-engaging portion to permit the said portion to feed the month ring forward for a first arc of one-twelfth revolution of the rotatable feed member at the expiry of a month and said second resilient tongue cooperating with the first tooth-engaging portion to permit the said portion to feed the date ring forward for a second arc of revolution of the rotatable feed member, said first and second arcs occupying successive portions of the rotation of the rotatable member, said date ring being provided with a side tooth projecting parallel to the base plate adapted to be engaged by the first tooth-engaging portion, the cover plate being formed with a third resilient tongue adapted to cooperate with the particular tooth of the month ring engaging with the second resilient tongue and cooperating with the second tooth-engaging portion, the teeth of the month ring being so shaped that at the end of a thirty-one day month the second and third resilient tongues prevent engagement between the side tooth and the first tooth-engaging member until the expiry of the thirty-first day, at the end of a thirty day month the second resilient tongue is positioned to permit engagement between the side tooth and the first tooth-engaging member at the expiry of the twenty-eighth day but such engagement is prevented by the third resilient tongue until the expiry of the thirtieth day (so that at the expiry of that day the date ring is fed forward through 2/31 of a revolution) and at the end of a twenty-eight day month the second and third resilient tongues permit engagement between the side tooth and the first tooth-engaging portion at the expiry of the twenty-eighth day (so that at the expiry of that day the date ring is fed forward through 4/31 of a revolution).

3. A date indicator as claimed in claim 2 wherein the date ring is provided with 30 similar teeth which position the first resilient tongue so that engagement between the second tooth-engaging member and the teeth of the month ring is prevented thereby, and a single further tooth which positions the first resilient tongue to permit engagement between the first tooth-engaging member and a month ring tooth when the numeral "1" is displayed by the date ring.

4. A date indicator as claimed in claim 3 comprising also a year ring, said year ring being mounted concentrically with the date and month rings upon the base plate, said year ring being provided with twelve teeth and also being provided with three repetitions of a sequence of markings carrying designations of years in the leap year cycle, said year ring teeth being adapted to be engaged by the second tooth-engaging member, and wherein the cover plate is formed with a fourth resilient tongue, the year ring teeth and month ring teeth being of such a configuration that the second tooth-engaging member is held out of engagement with the year teeth by the month teeth except when the month ring is engaged by the second tooth-engaging member at the end of December, the tooth then engaged being of such a configuration that engagement of a year ring tooth is also permitted, the fourth resilient tongue cooperating with the first tooth-engaging member and the year teeth being so shaped that in leap year engagement of the first tooth-engaging member with the side tooth on the date ring is prevented by the fourth resilient tongue at the expiry of 28th February but is permitted thereby at the expiry of 29th February and in other years engagement of the first tooth-engaging member is unaffected by said fourth tongue.

5. A date indicator as claimed in claim 4 comprising also a day ring, said day ring being mounted concentrically with the said date, month and year rings, said day ring being provided with seven teeth and also being provided with designations of the days of the week, together with means carried by the said rotatable feed member and cooperating with the said cover plate to engage with the day ring teeth and feed the day ring forward through 1/7 revolution for each revolution of the rotatable feed member, the corresponding arc of revolution of the feed member terminating substantially at the commencement of the second arc of the movement thereof.

6. In combination in a date indicator, a support member, a date ring carrying numerals representing the days of the month distributed in sequence thereon, a month ring carrying designations of the months distributed in sequence thereon, said rings being concentrically mounted on said member for relative rotation, said rings having teeth thereon in a single row, a movable feed member, a plate member having first and second resilient tongues positioned to engage respectively the teeth of the date and month rings, said feed member having first and second tooth-engaging portions for engaging the teeth of said rings respectively, said first resilient tongue cooperating with said second tooth-engaging portion to permit the said portion to move the month ring an amount corresponding to one month, said second resilient tongue cooperating with said first tooth engaging portion to move the date ring an amount corresponding to one day, each said tongue cooperating with the teeth on a corresponding ring to prevent backward motion thereof.

References Cited in the file of this patent

UNITED STATES PATENTS

| 786,181 | Ballantyne | Mar. 28, 1905 |
| 2,146,981 | Paulin | Feb. 14, 1939 |
| 2,458,092 | Morris | Jan. 4, 1949 |
| 2,470,692 | Farr | May 17, 1949 |

FOREIGN PATENTS

| 478,551 | Great Britain | Jan. 20, 1938 |
| 543,270 | Great Britain | Feb. 17, 1942 |